United States Patent
Mao et al.

(10) Patent No.: US 8,074,895 B2
(45) Date of Patent: Dec. 13, 2011

(54) FUEL INJECTION AND MIXING SYSTEMS HAVING PIEZOELECTRIC ELEMENTS AND METHODS OF USING THE SAME

(75) Inventors: Chien-Pei Mao, Clive, IA (US); John Short, Norwalk, IA (US); Jim Klemm, Des Moines, IA (US); Royce Abbott, Des Moines, IA (US); Nick Overman, West Des Moines, IA (US); Spencer Pack, Urbandale, IA (US); Audra Winebrenner, Des Moines, IA (US)

(73) Assignee: Delavan Inc, West Des Moines, IA (US)

( * ) Notice: Subject to any disclaimer, the term of this patent is extended or adjusted under 35 U.S.C. 154(b) by 0 days.

(21) Appl. No.: 11/734,260

(22) Filed: Apr. 11, 2007

(65) Prior Publication Data
US 2008/0121736 A1 May 29, 2008

Related U.S. Application Data
(60) Provisional application No. 60/791,602, filed on Apr. 12, 2006.

(51) Int. Cl.
*B05B 1/08* (2006.01)
*B05B 3/04* (2006.01)
*F02M 7/22* (2006.01)
(52) U.S. Cl. ... 239/102.2; 239/102.1; 239/4; 239/590.5; 239/92; 239/533.2; 261/38; 261/49; 261/50.1; 261/79.1
(58) Field of Classification Search ............... 239/102.1, 239/102.2, 585.1–585.5; 261/1, 38, 49, 50.1, 261/79.1
See application file for complete search history.

(56) References Cited

U.S. PATENT DOCUMENTS

| | | | |
|---|---|---|---|
| 3,731,876 A | | 5/1973 | Showalter |
| 3,756,575 A | * | 9/1973 | Cottell ............................. 261/1 |
| 3,868,698 A | | 2/1975 | Dressler |
| 4,337,896 A | * | 7/1982 | Berger et al. .............. 239/102.2 |
| 4,659,014 A | | 4/1987 | Soth et al. |
| 4,703,213 A | * | 10/1987 | GaHerbert ............... 310/316.01 |
| 4,770,151 A | | 9/1988 | Finlay |
| 5,248,087 A | | 9/1993 | Dressler |
| 6,162,046 A | | 12/2000 | Young et al. |
| 6,238,815 B1 | | 5/2001 | Skala et al. |
| 6,338,472 B1 | | 1/2002 | Shimazu et al. |

(Continued)

FOREIGN PATENT DOCUMENTS
DE   10 2004 055 425 A1   5/2006
(Continued)

OTHER PUBLICATIONS
European Search Report dated Jul. 16, 2007.
(Continued)

*Primary Examiner* — Len Tran
*Assistant Examiner* — James Hogan
(74) *Attorney, Agent, or Firm* — Scott D. Wofsy; Edwards Wildman Palmer LLP

(57) ABSTRACT

A fuel injection and mixing system is provided that is suitable for use with various types of fuel reformers. Preferably, the system includes a piezoelectric injector for delivering atomized fuel, a gas swirler, such as a steam swirler and/or an air swirler, a mixing chamber and a flow mixing device. The system utilizes ultrasonic vibrations to achieve fuel atomization. The fuel injection and mixing system can be used with a variety of fuel reformers and fuel cells, such as SOFC fuel cells.

14 Claims, 15 Drawing Sheets

U.S. PATENT DOCUMENTS

| | | |
|---|---|---|
| 6,418,960 B1 * | 7/2002 | Mintz et al. .................... 137/242 |
| 6,450,417 B1 * | 9/2002 | Gipson et al. ...................... 239/5 |
| 6,601,776 B1 | 8/2003 | Oljaca et al. |
| 6,627,342 B1 | 9/2003 | Nakamura et al. |
| 6,630,244 B1 | 10/2003 | Mao et al. |
| 6,641,084 B1 | 11/2003 | Huber et al. |
| 6,752,124 B1 | 6/2004 | Chang |
| 6,760,212 B2 | 7/2004 | Cheever, Jr. et al. |
| 6,803,029 B2 | 10/2004 | Dieckmann |
| 6,866,024 B2 | 3/2005 | Rizzoni et al. |
| 6,880,770 B2 * | 4/2005 | Jameson et al. ........... 239/533.2 |
| 7,318,846 B2 * | 1/2008 | Boltze et al. ...................... 48/61 |
| 7,424,883 B2 * | 9/2008 | McNichols et al. .......... 123/490 |
| 2004/0000296 A1 | 1/2004 | Linna et al. |
| 2004/0086436 A1 | 5/2004 | Boltze et al. |
| 2004/0124259 A1 | 7/2004 | Guezennec et al. |
| 2005/0081833 A1 | 4/2005 | Pellizzari et al. |
| 2005/0210877 A1 | 9/2005 | Rabinovich et al. |

FOREIGN PATENT DOCUMENTS

| | | |
|---|---|---|
| EP | 0903184 | 3/1999 |
| EP | 1 243 630 A2 | 9/2002 |
| EP | 1243 630 A2 | 9/2002 |
| EP | 1252679 | 10/2002 |
| EP | 1 571 726 A1 | 9/2005 |
| EP | 1571726 A1 | 9/2005 |
| FR | 2417018 | 9/1979 |
| GB | 944 845 A | 12/1963 |
| WO | WO 94/05906 | 3/1994 |
| WO | WO 01/54219 A1 | 7/2001 |
| WO | WO 2004/035188 | 4/2004 |
| WO | WO 2004/050257 A1 | 6/2004 |
| WO | WO 2004/065782 | 8/2004 |
| WO | WO 2004/091758 A1 | 10/2004 |
| WO | WO 2006/053534 A1 | 5/2006 |

OTHER PUBLICATIONS

International Search Report dated Apr. 20, 2007.
International Search Report dated Apr. 25, 2007.
Sono-Tek, How Ultrasonic Nozzles Work, http://www.sono-tek.com/electronics/page/how_they_work, 2 pages.

* cited by examiner

FUEL INJECTION AND MIXING SYSTEMS HAVING PIEZOELECTRIC ELEMENTS AND METHODS OF USING THE SAME

CROSS-REFERENCE TO RELATED APPLICATIONS

This application claims the benefit of priority of U.S. Provisional Application Ser. No. 60/791,602 filed Apr. 12, 2006. This application is incorporated by reference herein in its entirety.

GOVERNMENT SUPPORT

The Government has rights in this invention, pursuant to Contract No. DE-FC26-04NT42229 awarded by the U.S. Department of Energy.

FIELD OF THE INVENTION

The present invention relates to fuel injection and mixing systems. Particularly, the present invention is directed to an integrated fuel injection and mixing system for fuel reformers or fuel processors to generate hydrogen-rich gas, such as for fuel cell applications.

BACKGROUND OF THE INVENTION

Fuel cells are an emerging technology that can significantly improve energy efficiency and energy security. Fuel cell technology can provide environmentally friendly electrical energy, producing far fewer harmful pollutants and lower levels of noise than conventional power generation systems. Although various types of fuel cells have been installed for commercial use, high manufacturing costs have largely prohibited them from being accepted for a wide variety of applications.

In addition to high manufacturing cost, the fuel cell industry is faced with several critical challenges that must be resolved before fuel cell systems can be fully commercialized for wide spread power generation applications. These challenges include, for example, a need to identify anode, electrolyte and cathode materials that provide lower electrochemical losses, a need for durable fuel cell interconnects, improved sealing concepts, compatible metallic interconnects, advanced stack cooling, low-cost fabrication processes, understanding soot and carbon deposit mechanisms, efficient fuel processor and regenerative desulfurization systems.

Among various types of fuel cells, the solid oxide fuel cell (SOFC) appears to exhibit many advantages over other fuel cell systems for power generation. For example, SOFCs have the highest energy efficiency of known fuel cells due to their high temperature operation. SOFCs can also tolerate low-cost catalytic materials. Existing studies indicate that SOFCs are probably one of the most reliable power generation technologies. SOFCs are well suited for integration with conventional gas turbine engines for improvements in fuel consumption and emission pollution. In addition, SOFCs can be supplied with hydrogen gas via hydrocarbon injector/reformer systems that convert hydrocarbon fuels into hydrogen gas and carbon monoxide, known as syngas, allowing full utilization of the existing refueling infrastructure. Because of these significant advantages, the fuel cell industry has been working diligently to develop compact, efficient fuel processors that can effectively convert the liquid hydrocarbon fuels into hydrogen-rich gas for utilization in SOFCs as well as other fuel cell systems.

Fuel processors are a very important component of SOFC systems, enabling them to compete with the conventional auxiliary power units (APU) in remote stationary and mobile power generation markets. Current state-of-the-art fuel processors are limited to using gaseous fuels, such as natural gas, hydrogen and liquefied petroleum gas (LPG). In the near term, however, liquid hydrocarbon fuels are the preferred choice for SOFC power systems because of their availability, high energy density, and existing distribution networks.

Currently, liquid fuel processing technology is not yet viable for commercial applications in SOFC systems. One technical barrier for liquid fuel processing is reactor durability. The performance of the reforming catalysts quickly deteriorates as a result of carbon deposition, sulfur poisoning and loss of precious metals due to sintering or evaporation at high temperatures. To mitigate these problems, numerous studies are being conducted to optimize catalyst materials and reactor design and operation.

One engineering approach that could alleviate problems associated with liquid fuel processing is improvement of feed stream preparation. Poor feed stream preparation such as inadequate atomization, wall impingement, and non-uniform mixing can easily lead to local conditions that favor carbon deposition and formation of hot spots in the reactor. Because liquid fuels are difficult to reform, a proper selection of injection and mixing systems for feed stream preparation plays an essential role in the development of reliable and durable liquid fuel processors.

In a typical fuel processor, liquid fuel is injected into preheated gas (e.g., steam and/or air) streams near the top of a mixing chamber. The liquid fuel must evaporate and be thoroughly mixed with the surrounding gas within a short distance prior to entering the catalytic reactor. During operation, the injection and mixing system must be able to accommodate varying power demands in a relatively short response time. In most mobile APU applications, there are very limited supply pressures available for liquid atomization and feed stream mixing, making it especially challenging for the design and development of fuel injection and mixing systems.

It is desirable to provide an injection and mixing system that can be easily integrated into various types of fuel processors. The fuel injection and mixing system must demonstrate better mixing capability and be more compact in size with fewer components and lower manufacturing cost than existing systems. It is also desirable to provide an injection and mixing system that requires very low supply pressures and energy power consumption. Finally, it would be desirable to provide an injection and mixing system that can demonstrate extended service life without the problem of carbon or coke deposition.

As will be shown herein, the present invention provides a solution for the problems and needs identified above.

SUMMARY OF THE INVENTION

The purpose and advantages of the present invention will be set forth in and apparent from the description that follows. Additional advantages of the invention will be realized and attained by the methods and systems particularly pointed out in the written description and claims hereof, as well as from the appended drawings.

To achieve these and other advantages and in accordance with the purpose of the invention, as embodied herein and broadly described, a fuel injection system and mixing system are provided wherein fuel, hot air, and/or steam are mixed. Preferably, the fuel injection and mixing system is designed to fit into various types of fuel processors. The fuel processors are operated with liquid hydrocarbon fuels to generate hydrogen-rich gas for use in a fuel cell such as a solid oxide fuel cell, for example, or other fuel cell system such as those utilized in auxiliary power generation units.

In accordance with a further aspect of the invention, the fuel injection and mixing system is preferably designed to directly operate with fuel processors, such as steam reformers, catalytic partial oxidation reformers, and auto-thermal reformers. The injection system has the ability to effectively vaporize liquid fuels and to achieve complete mixing within a short distance at various operating conditions, particularly at relatively low fuel flow rates.

In accordance with still a further aspect of the invention, the fuel injection and mixing system may include a piezoelectric fuel atomizer, a piezoelectric driver unit, one or more steam and/or air metering methods that may include combinations of swirlers or discrete jets with swirl angle(s) of zero degrees or more, an injector housing, and a mixing chamber. The piezoelectric driver unit preferably contains a plurality of function generators, a frequency sweep/pulse modulator, a voltage control gate, an amplifier, a transformer, and a power supply which are capable of supplying electrical signals at various duty cycles and operating frequencies. In accordance with one embodiment of the invention, the piezoelectric driver unit includes two function generators. These components are properly integrated as a compact unit to meet the various requirements of liquid fuel atomization. Another embodiment includes a means of phase tracking to ensure the drive frequency is always the resonant frequency of the atomizer, as this frequency may be expected to change with such parameters as temperature fluid flow rates, and age.

In accordance with yet a further aspect of the invention, the feed streams may be prepared in the form of a homogeneous vapor mixture prior to entering the catalytic reactor. The feed streams can include, for example, liquid fuel, steam and/or hot air. Piezo ceramic discs, strategically located within the injector, are preferably provided to induce mechanical vibrations when activated with a high frequency electrical current supplied by the piezoelectric driver circuit. The mechanical vibrations induced by the piezo ceramic discs upon a mechanical atomizer tip, on which liquid fuel is deposited causing the bulk liquid to break up into finely atomized droplets at the injector tip. The droplets quickly vaporize as they contact the hot steam and/or air flows, and are thoroughly mixed within the mixing chamber. Preferably, the hot air and/or steam flow is supplied uniformly around the injector tip through swirlers.

In accordance with a further aspect of the invention, in one embodiment, the piezoelectric atomizer may include an upper section and a lower section, with two piezo ceramic rings and an electrode sandwiched between the upper section and lower section. The geometry of both the upper and lower sections is such that the injector will support a standing wave of a preselected frequency. A fuel inlet fitting can form a part of the upper section for one of the methods of fuel delivery. The lower section carries and amplifies the acoustic waves produced by the piezo ceramic rings to an atomizing face at the tip of the atomizer.

Fuel may be delivered to the injector tip in a variety of manners. In accordance with one embodiment, fuel is delivered through a centerline passage that terminates just short of an atomizing face of the device. A number of smaller outwardly angled passages can be provided to evenly distribute the fuel over the atomizing face through equally spaced openings near the perimeter of the atomizing face. In accordance with another embodiment, fuel is delivered to the atomizing tip externally, wherein the lower and upper resonator sections do not have a fuel passage defined therethrough. Rather, fuel may be delivered onto to an external surface of the stem by impingement thereon of multiple fuel streams produced from small orifices to which the fuel is supplied by a fuel delivery circuit contained within the body encompassing the atomizer body. The delivered fuel forms a film on the stem and flows down to the atomizing face. The ultrasonic vibrations are preferably focused and come to a maximum amplitude at the atomizing face, which causes the accumulated fuel to dislodge from the surface of the atomizing face in the form of atomized droplets.

In accordance with another aspect of the invention, the gas swirlers used in association with various embodiments of the present invention are designed to direct heated gas streams, such as streams including steam and/or air, in such a way as to interact with the fuel droplets in order to provide additional atomization and mixing. The gas swirlers can also be adapted and configured to direct gas jets toward the atomizing face to wipe the atomizing face and to break up any fuel which may amass on the atomizing face. The gas swirlers can also prevent droplets from adhering to the chamber walls or accumulating near corner areas of the chamber, in order to protect chamber walls from carbon formation.

The mixing chamber is preferably adapted and configured to deliver a well-mixed flow of fuel and gases of uniform velocity and temperature distribution over the entire reactor face. Sufficient interaction and dwell time are provided to allow the fuel to become substantially fully vaporized and for the gases to be mixed substantially uniformly. Areas of strong recirculating flow are preferably avoided, due to the potential of spontaneous combustion and carbon formation. One embodiment of such a mixing chamber includes a divergent section followed by a constant area section(s) and possibly a convergent section, in which mixing devices are placed or mixing geometries integrated into the mixing chamber body. Numerous embodiments are possible which include, but are not limited to those disclosed herein.

In accordance with one aspect of the invention, a mixing chamber embodiment is provided that utilizes a flow stabilizing mixer that anchors the swirling spray around the center body and keeps the spray from fluttering or biasing towards one side. The mixer may contain a center body that has a pointed nose and tail section with helical vanes positioned in the middle section. The helical vanes can be arranged to provide either co-swirling or counter-swirling flows relative to the swirl direction of the spray. Although applicants have discovered that both co-swirling and counter-swirling mixers work well, applicants have found that co-swirling mixers seem to perform better in keeping the chamber wall surface clean while counter-swirling mixers provide superior vapor mixing and uniformity. The swirl strength of the mixer can be adjusted so that vortices and central recirculation zones are minimized or canceled out downstream of the mixer. A proper distance is preferably maintained between the injector and the mixer to minimize reversed flow and excess fuel accumulation in the upstream region of the mixer.

In accordance with another aspect of the invention, a mixing chamber embodiment may be provided having two concentric swirlers, including an inner swirler on the center body and an outer swirler attached to a circular dividing ring. Depending on the vane angles and swirl directions, varying degrees of mixing between the feed streams can be achieved.

Preferably, the inner swirler has an opposite swirl direction than that of the spray and the outer swirler has the same swirl direction as that of the spray.

In accordance with still another aspect of the invention, a mixing chamber embodiment may be provided including a stack of perforated plates to further enhance the mixing and uniformity of the feed streams prior to entering the reactor. The perforated plates can be very effective in redistributing the fuel/gas mixture evenly near the reactor entrance area. The porosity, spacing, alignment, and number of the perforated plates can be selected to minimize the pressure loss across the mixing chamber.

In accordance with another aspect of the invention, a mixing chamber embodiment is provided wherein the midsection of the inner wall of the mixing chamber transitions from a circular shape into a contour resembling a star shape with rounded corners. The outer "fingers" or lobes of the inner wall diverge from the centerline (moving downstream), while the contour in the central "hub" area of the inner wall converges. This configuration effectively mixes and evens the flow field within a very short distance downstream, typically within a distance equal to approximately two diameters of the mixing chamber. In accordance with a further aspect of the invention, the mixing swirlers and perforated plates can be interchangeably installed and even installed simultaneously in series in the mixing chamber to optimize the injector performance.

Other objects and advantages of the present invention will be made apparent to those skilled in the art from the accompanying drawings and descriptions. It is to be understood that both the foregoing general description and the following detailed description are exemplary and are intended to provide further explanation of the invention claimed.

The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF THE DRAWINGS

For a fuller understanding of the nature and desired objects of the present invention, reference is made to the following detailed description taken in conjunction with the accompanying figures. In the drawings, like reference characters generally refer to the same parts throughout the different views. Also, the drawings are not necessarily to scale, emphasis instead being placed upon illustrating the principles of the invention.

DETAILED DESCRIPTION OF PREFERRED EMBODIMENTS

Reference will now be made in detail to the present preferred embodiments of the invention, examples of which are illustrated in the accompanying drawings. The method and corresponding steps of the invention will be described in conjunction with the detailed description of the system.

Figure 1:
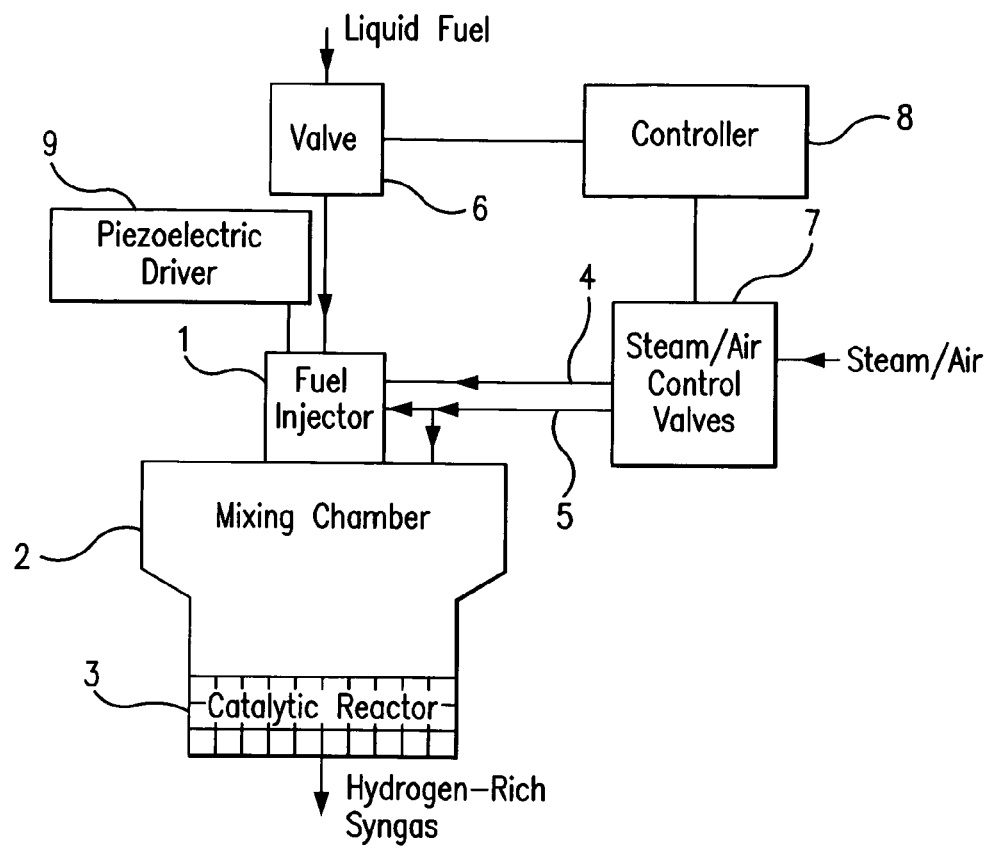
FIG. 1 is a schematic diagram of an exemplary fuel reformer system.
Figure 2:
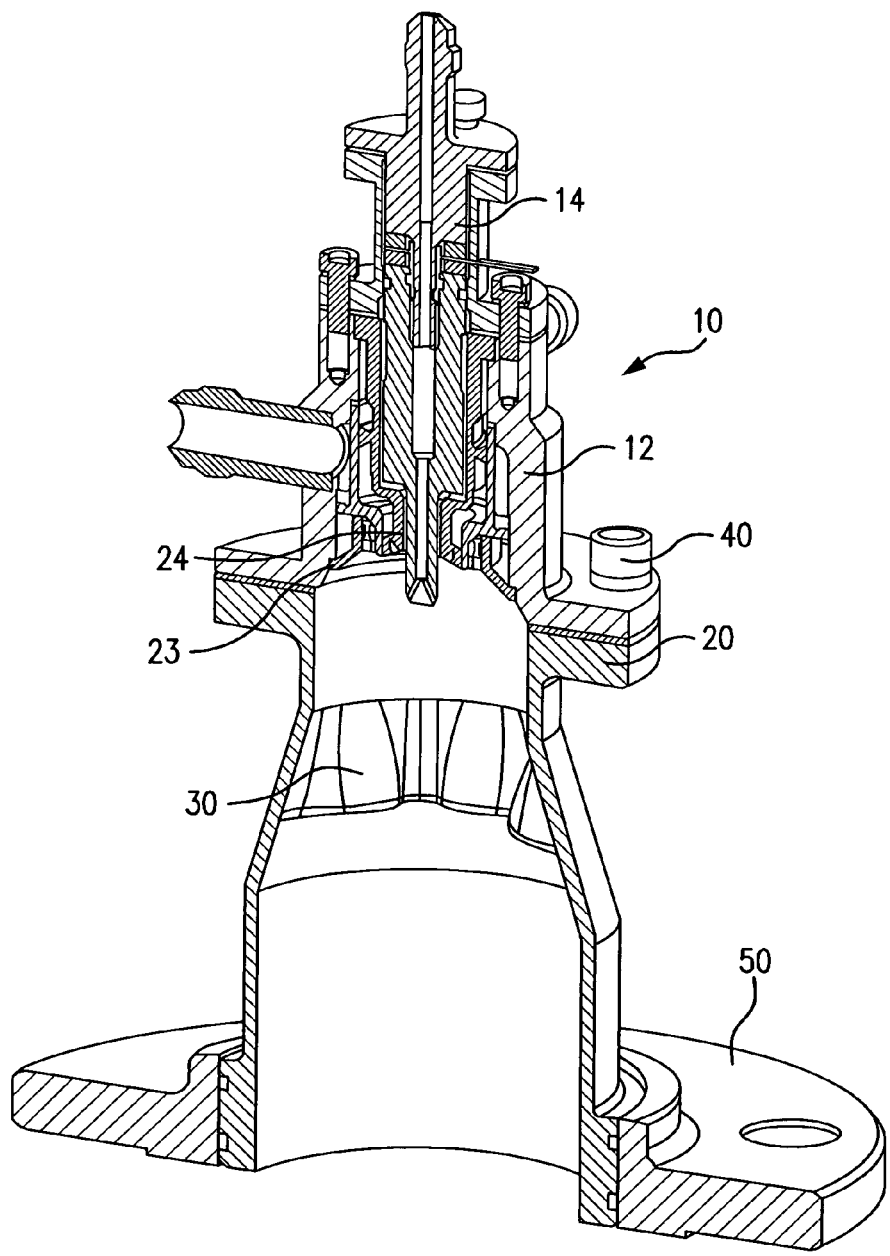
FIG. 2 is a cross section view of an injection and mixing system made in accordance with the present invention.

For purpose of explanation and illustration, and not limitation, a partial view of an exemplary embodiment of a fuel injection and mixing system in accordance with the invention is shown in FIG. 2 and is designated generally by reference character 10. Other embodiments of a fuel injection and mixing system in accordance with the invention, or aspects thereof, are provided in FIGS. 1 and 3-11, as will be described.

In accordance with the invention, a fuel injection and mixing system is provided that is suitable for use with various types of fuel reformers. Preferably, the system includes a piezoelectric injector for delivering atomized fuel, gas swirler(s), such as a steam and/or an air swirler, and a mixing chamber, which includes one or more flow mixing devices. The system utilizes ultrasonic vibrations to achieve fuel atomization.

Referring to FIG. 1, a fuel reformer system provided in accordance with an embodiment of the invention includes an integrated fuel injection and mixing system that is directly connected to a catalytic reactor 3 to generate hydrogen-rich syngas using liquid hydrocarbon fuels for a fuel cell, such as a solid oxide fuel cell. Liquid fuel is supplied to an injector 1 via a control valve 6 and a gas stream 4 is supplied through a regulator valve 7 to assist fuel atomization. Depending on the reformer type, the atomizing gas stream 4 could be either steam flow, hot airflow, or a mixture of both. In the case of steam and auto-thermal reformers, the atomizing gas stream 4 will be using the steam flow. On the other hand, hot airflow can be supplied as the atomizing gas for the injector in the case of a partial oxidation reformer. For most fuel reforming applications, it is preferred that a uniform, secondary airflow 5 be supplied around the fuel injector 1 to help mixing and prevent droplets from attaching to the chamber walls. A controller 8 is used to adjust the required flow rates for all three feed streams, including liquid fuel, steam and hot air. The fuel injector 1 is equipped with a piezoelectric driver unit 9, supplying uniform fuel vapor mixture for the catalytic reactor 3 to generate hydrogen-rich syngas.

For purposes of illustration only, and not limitation, as embodied herein and as depicted in FIG. 2, there is shown an illustrative embodiment of an integrated fuel injection and mixing system 10 that may be used to prepare a fuel stream for a typical auto-thermal reformer (ATR). The major components of the injection and mixing system include an injector housing 12, a piezoelectric atomizer 14, an air swirler 23, a steam swirler 24, a mixing chamber 20, a lobed mixer 30 and a mounting flange 50. As depicted, the injector housing 12 is mounted on the mixing chamber 20 using screws 40 so that it can be easily removed for maintenance or replacement purposes. The injection and mixing system 10 has the ability to atomize liquid hydrocarbon fuels and to achieve complete or nearly complete evaporation and mixing of the fuel within a short distance under various operating conditions.

Figure 3A:
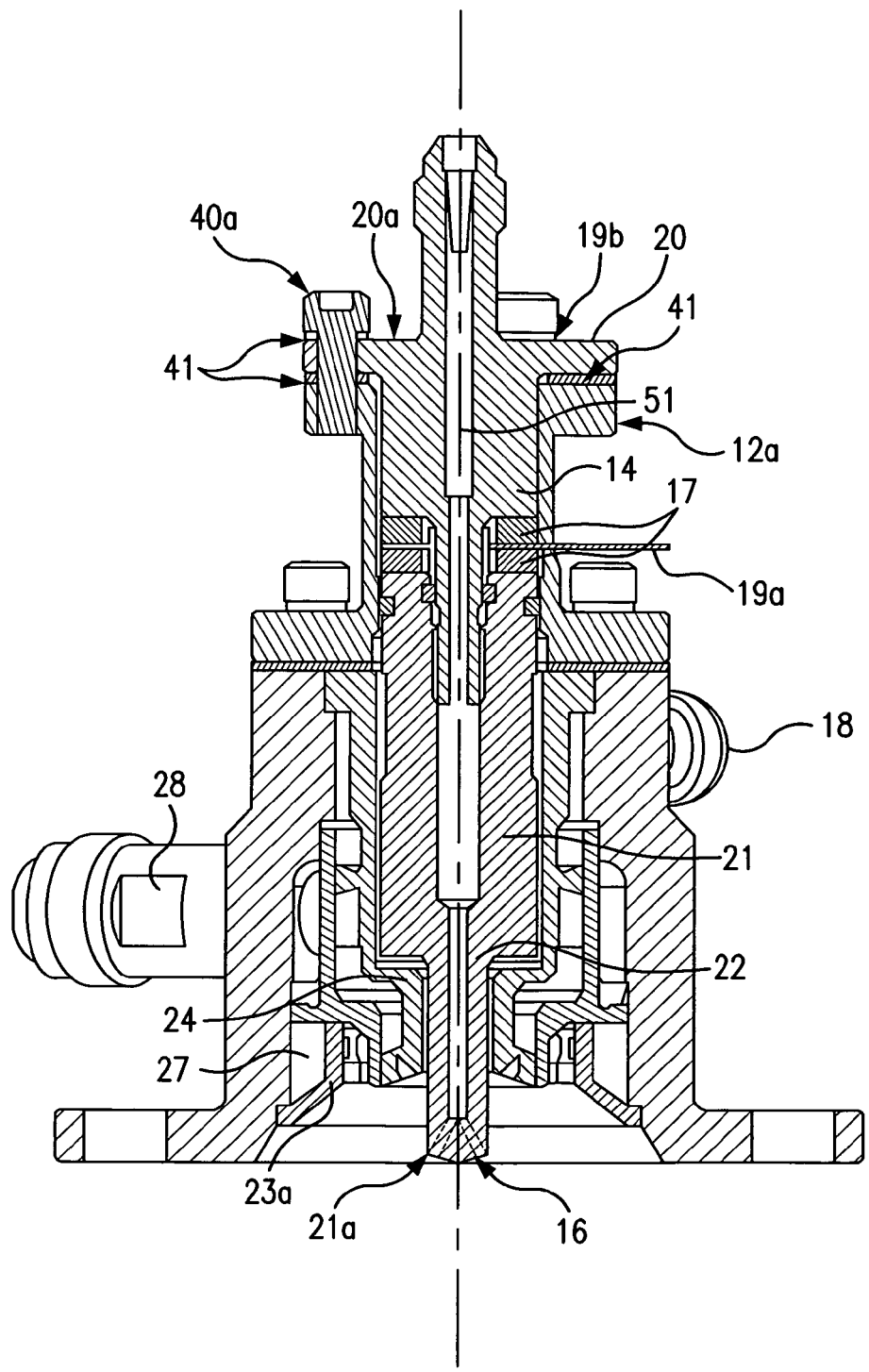
FIGS. 3(A)-3(D) show detailed section views of different embodiments of fuel atomizers made in accordance with the present invention.
Figure 3B:
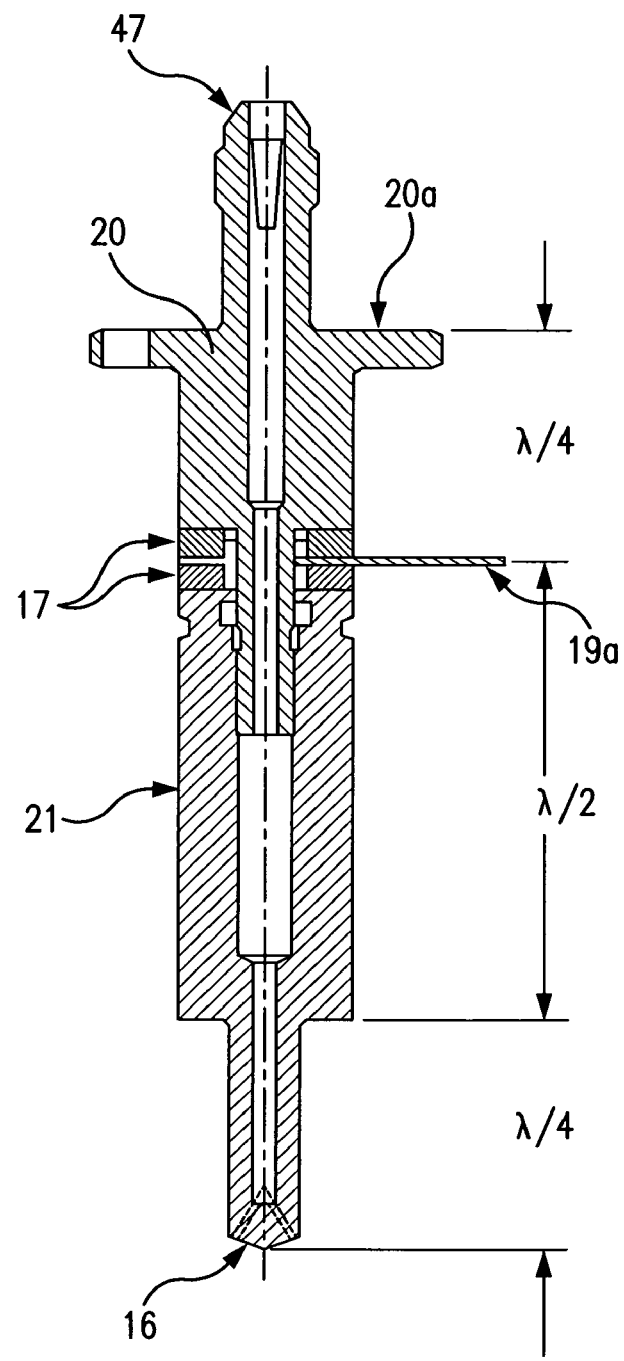
Figure 3C:
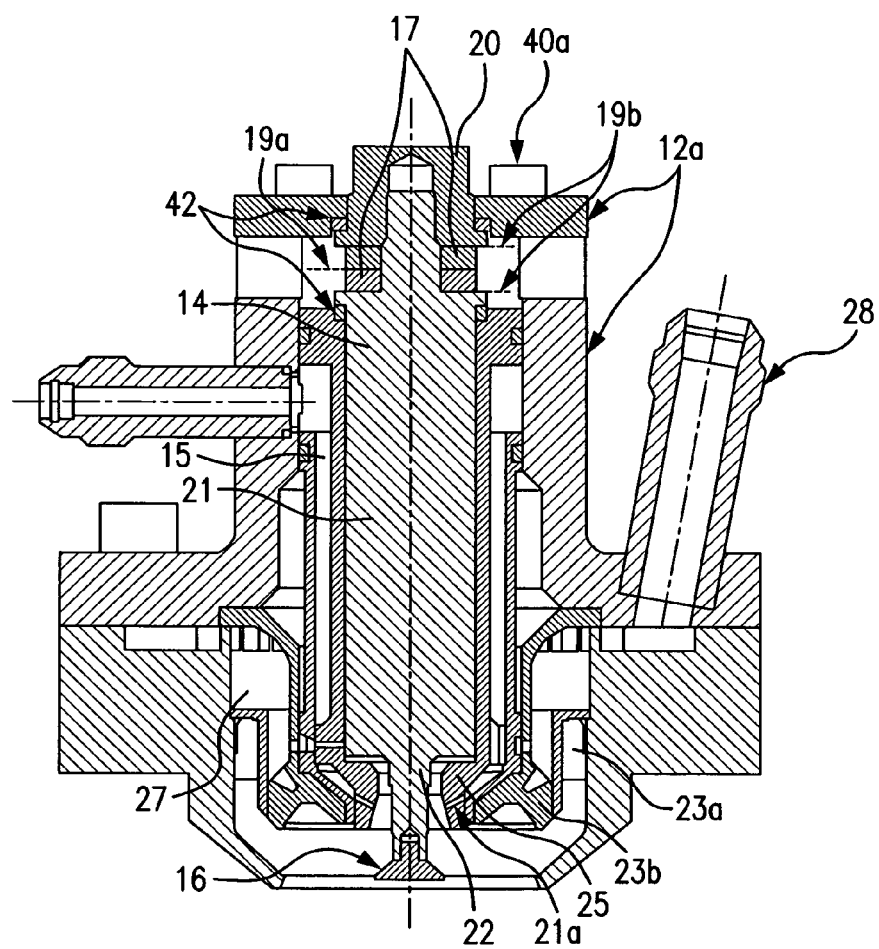
Figure 3D:
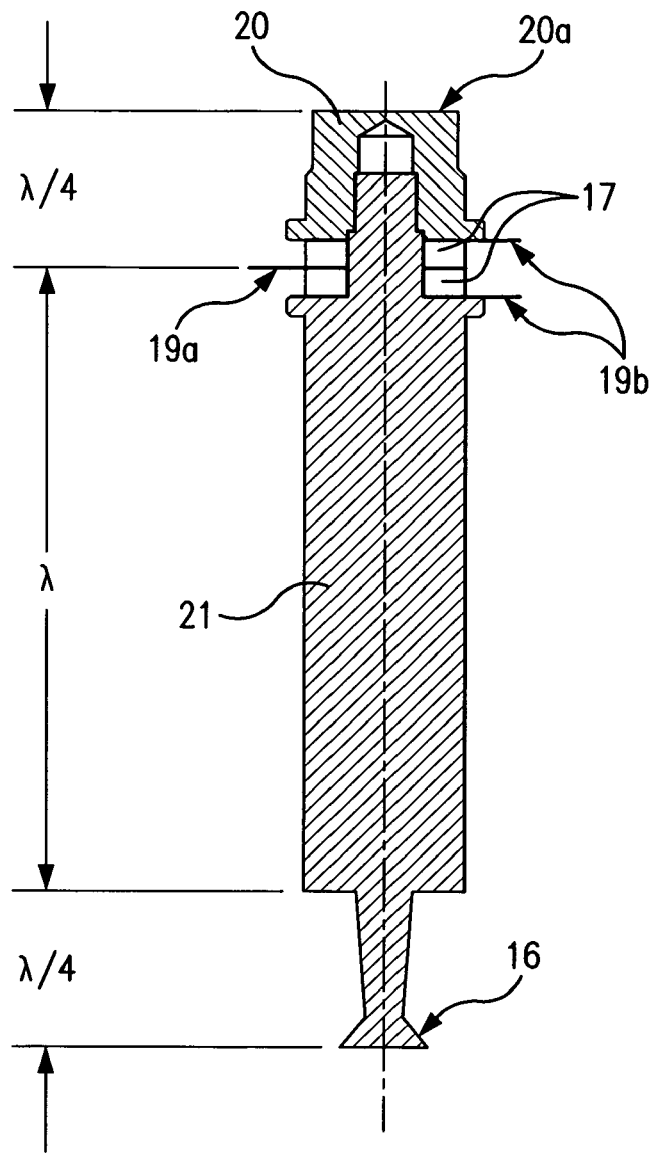
Figure 4:
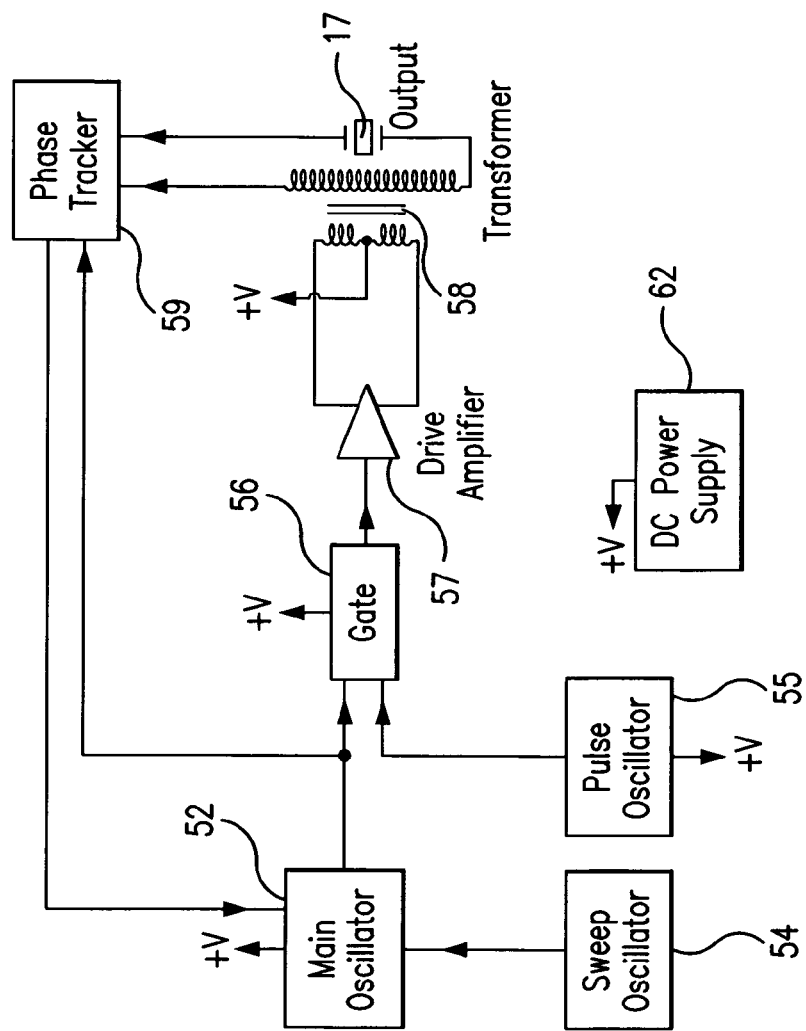
FIG. 4 is a circuit diagram of a piezoelectric driver unit made in accordance with the present invention.

FIGS. 3(A)-3(D) show the detailed structure of two embodiments of the piezoelectric atomizer 14. A first embodiment is depicted in FIGS. 3(A)-3(B) and a second embodiment is depicted in FIGS. 3(C)-3(D). Generally, during reformer operation, liquid fuel is fed through a fuel passage 15 to the atomizing face 16. Fuel droplets are formed at the atomizing face 16 as the tip vibrates ultrasonically at a resonant frequency. Vibration is induced when ultrasonic signals supplied by a remote piezo driver unit 9 are applied to two piezoelectric transducer discs 17. Piezoelectric discs 17 are made of, but not limited to, lead zirconate titanate material and can be obtained, for example from Omega Piezo Technologies, Inc. located at 2591 Clyde Ave. Suite #3, State College, Pa. 16801. Driver current is introduced through a positive electrode 19*a*, nested between the discs, and a negative (ground) electrode(s) 19*b* attached to the upper atomizer section 20, or sandwiched between each of the piezo-crystals and injector bodies. Longitudinal pressure waves produced by the piezoelectric transducer discs 17 pass through the resonator 21, and are amplified at point 22, where the resonator diameter is abruptly reduced.

A first embodiment of a resonator 21 depicted in FIGS. 3(A)-3(B) has a plurality of equally spaced feed passages 21*a* angled outwardly around the perimeter of the atomizing face 16 to distribute the fuel. Eight passages 21*a* are present in the embodiment of FIG. 3(A), although only two are depicted in the cross-section presented. FIG. 3(C) depicts a second configuration of a resonator 21 having a broadened atomizing tip in which fuel is delivered onto the external surface of the stem, by means of fuel jets 21*a* supplied by a fuel passage 15 contained within a body 25 surrounding the resonator 21, where gravitational effect and possible air or steam assistance pulls/pushes the fuel onto the broadened tip 16 where atomization of the liquid fuel occurs.

The dimensions of atomizer 14 are selected so that atomizer 14 will operate at a desired resonant frequency. In accordance with the embodiment of FIGS. 3(A)-3(B), atomizer 14 has a body that is one full wavelength (excluding the fuel fitment 47 at the proximal end). In accordance with the embodiment of FIGS. 3(C)-3(D), atomizer 14 has a body that is 1.5 wavelengths. The location of electric lead 19 denotes a node point where the amplitude of the applied wave is zero. The proximal portion of the upper resonator 14 is one quarter wavelength from lead 19 to the top surface 20*a* of upper resonator section 20. Similarly, the lower portion of atomizer 14 including resonator 21 and tip 16 is about three quarters or one and a quarter wavelength depending on the embodiment. Thus, the amplitude of the applied energy at the location of lead 19 is preferably zero, while it is preferably at a maximum at locations 20*a* and 16.

As depicted in FIG. 3(A), piezoelectric atomizer 14 is mounted to the upper portion of the injector housing 12*a* by a plurality of screws 40*a*. A dampening gasket material 41 is interposed between atomizer 14 and upper housing 12*a* and underneath screws 40*a* to help physically isolate atomizer 14 from the rest of the system as well as to provide a fluid seal. As depicted in FIG. 3(C), the piezoelectric atomizer is suspended in the upper portion of the injector housing 12*a* by o-rings 42. The o-rings physically isolate atomizer 14 from the rest of the system as well as to provide a fluid seal. As such, atomizer 14 does not physically contact any other portion of system 10 (such as housing 12 or injector swirlers 23, 24) to minimize the effect of the injector housing 12 on the resonant frequency of the atomizer 14.

As depicted, the atomizing face 16 comprises the distal surface of atomizer 14. As indicated above, atomizer 14 is configured to form a wave extinction plane at atomizing face 16 by providing maximum wave amplitude at that location. In the case of auto-thermal reforming a fuel injector such as described in FIG. 3(A) would be utilized. High-temperature steam flow is supplied through an inlet port 18 and a steam swirler 24 to assist fuel atomization and mixing. In applications where only one gas inlet is required, such as catalytic partial oxidation systems (CPOX), or steam reformer systems (SR), or where steam is premixed with hot air, an injector such as described in FIG. 3(C) could be utilized. In both embodiments, hot airflow is supplied through inlet port 28 and passage 27 into an air swirler(s) 23*a* and 23*b*. To ensure circumferential uniformity, the steam and/or air gases are forced through multiple angled vanes and sharp bends and/or discrete holes. The fuel spray, steam, and air flows immediately begin to mix in front of the atomization face 16.

Depending on the embodiment, the resonant frequency of the atomizer can vary between about 40-120 kHz. The natural resonant frequency of the atomizer changes depending on the length of the atomizer 14. However, shifts in the resonant frequency of the system can change with variations in the flow rate of fuel through the atomizer or on the atomizer surface 16. It will be recognized that the optimal operating frequency of the atomizer depends on many parameters, including compression of the piezoelectric discs 17, fuel flow rate, fuel properties, temperature, resonator material and the physical size of the unit, for example. Even though efforts can be made to isolate the fuel atomizer 14 from the housing unit 12, the housing unit 12 may also influence the resonant frequency.

Although the piezoelectric atomizer is designed to operate at a particular frequency, factors such as atomizer temperature and fuel flow will cause the frequency to shift. Various control strategies can be incorporated into the driver to enable it to maintain the fuel atomization. In one configuration the driver unit is equipped with both sweeping and pulse control functions that modulate the vibrational amplitude for optimal atomization. When the vibrational amplitude is periodically increased and decreased, it also provides the benefit of minimizing the power consumption. The external sweeping control is operated at low frequency to cause a ±0.5% deviation of the main oscillation frequency. In another configuration the driver unit will monitor the phase angle between the voltage and current supplied to piezoelectric discs and adjust the frequency to maintain optimal atomization.

FIG. 4 schematically illustrates the components of an exemplary driver circuit for the piezoelectric atomizer described herein. The driver circuit includes a main oscillator 52, a control gate 56, a drive amplifier 57, a transformer 58 and a power supply 62. The driver circuit may also include a sweep oscillator 54, a pulse oscillator 55, and a phase tracker 59.

The output of the main oscillator 52, which may be sweep controlled and/or phase modulated, is connected to a control gate 56 that delivers the voltage controlled signals to the drive amplifier 57. A phase tracker 59 may be incorporated to monitor the phase between output current and input voltage. Corrections are made by shifting the frequency of the main oscillator to match the driver frequency to the atomizer's resonant frequency. A pulse oscillator 55 may also be connected to the control gate 56 to provide additional duty cycle control for the main oscillating frequency. The output of drive amplifier 57 is coupled through a transformer 58 to the piezoelectric transducer discs 17 of the atomizer to achieve the required operating voltages. A regulated DC power supply 62 is utilized to energize the entire driver circuit.

In accordance with one example, an exemplary driver circuit was constructed capable of operating over a range from about 30 kHz to about 65 kHz. The frequency sweep provided was 0 to 15 Hz by means of an external sweep oscillator. The frequency deviation was proportional to applied sweep voltage. An output amplitude of 100 to 800 VRMS was provided having a quasi-square wave. The power output to the ceramic discs 17 was about 200 watts. Preferably, an output signal of the ultrasonic driver varies periodically between a high and low voltage.

In accordance with the embodiment of FIGS. 3(A)-3(B), a fuel flow rate of approximately 15 pounds per hour and lower is preferred, such as five pounds per hour or one pound per hour. However, it will be recognized that higher fuel flow rates are possible, such as with the embodiment of FIGS. 3(C)-3(D). Additionally, higher flow rates (such as greater than 10 pounds per hour) can be achieved by increasing the power supplied to the piezo-crystals, by optimizing the tip location with respect to gas swirlers, and by optimizing the air and/or steam swirlers. In accordance with an alternative embodiment, the fuel injection and mixing system of the invention can be operated at very low flow rates such as less than one pound of fuel per hour. Other fuel injection systems operating on non-ultrasonic principles to atomize the fuel (such as by spraying pressurized streams) do not operate as well as the injector of the present invention at such low flow rates since such pressurized systems tend to foul at low flow rates. Since fuel can be delivered very slowly out of openings 21a onto atomization face 16, extremely low flow rates can be achieved. Such low flow rates can be advantageous and used to fuel devices such as microturbines and the like.

As shown in FIG. 2, the feed streams encounter a lobed mixer 30 as they progress downstream. The lobed mixer 30 induces a myriad of vortices as the fuel mixture moves past the rippled trailing edge, resulting in improved mixture uniformity. The lobed mixer 30 thus affects the degrees of mixing and uniformity of the feed streams before the streams enter the reactor 3. Mixer 30 also helps reduce the mixture velocity induced by the high-speed fuel vapor and surrounding gas. Depending on the reformer requirements, the central mixer may have various designs, containing different spray mixers and mixing devices.

Figure 5A:
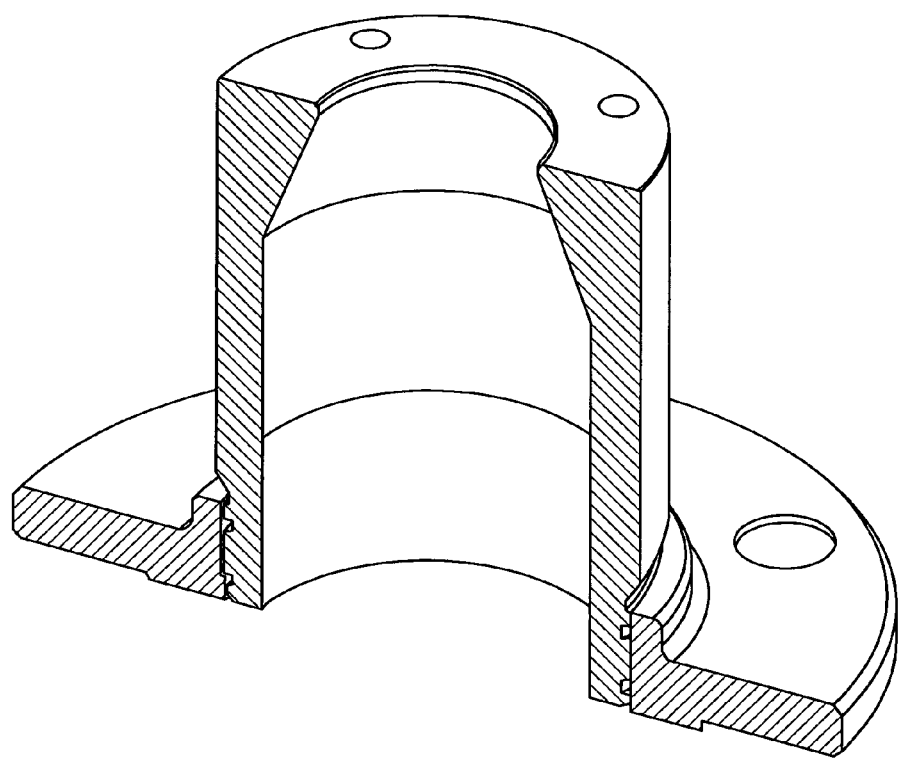
FIGS. 5(A)-5(B) show a perspective view of a mixing chamber embodiments without any mixing devices disposed therein made in accordance with the present invention.
Figure 5B:
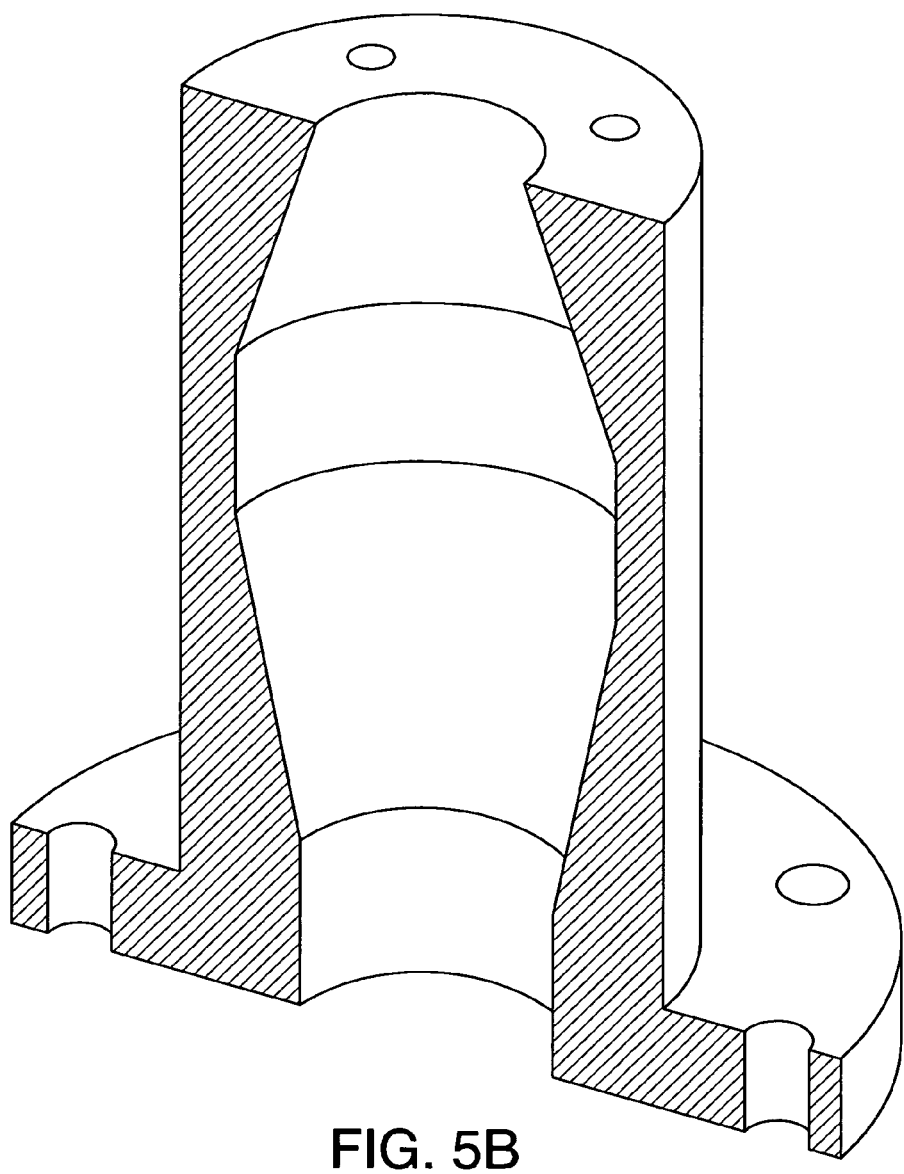
Figure 6:
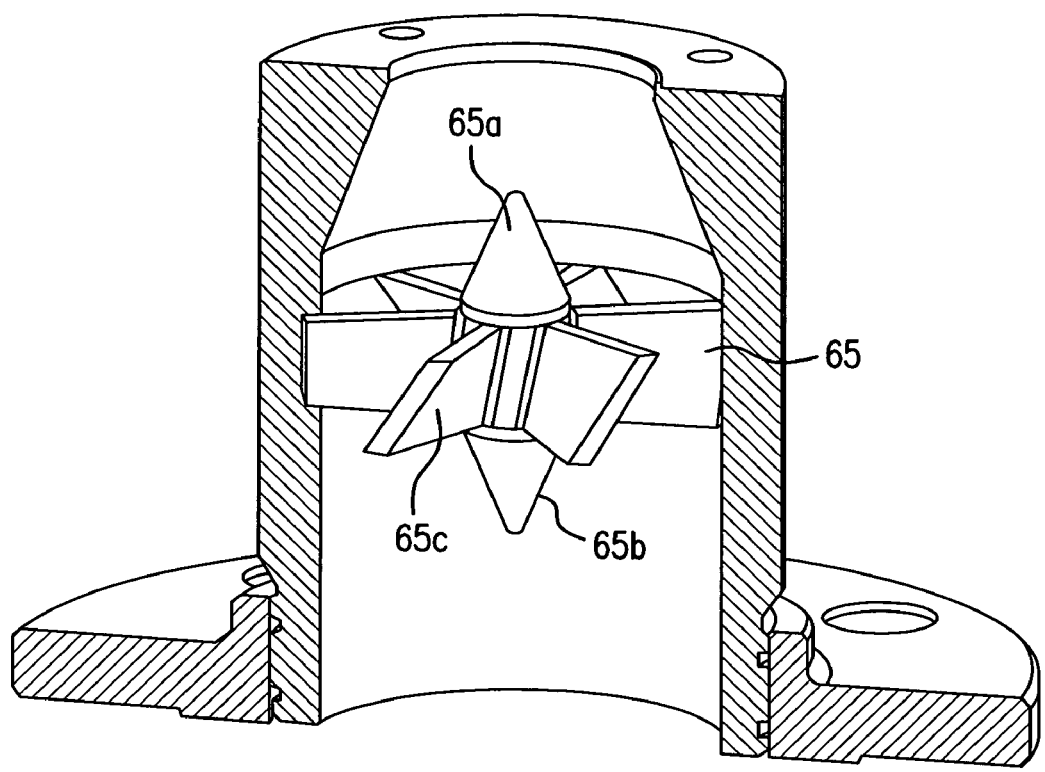
FIG. 6 shows a perspective view of a mixing chamber with a single swirler mixer made in accordance with the present invention.

FIGS. 5(A)-5(B) show a perspective view of mixing chamber embodiments without any mixing devices. The interior configuration and length of the chamber may vary depending on the characteristics of the fuel sprays, such as spray angle, pattern and velocity, and may also include an aft convergent, divergent, or more complex transition section to aid in mixing and/or to allow proper alignment to the downstream system components.

FIGS. 6 through 10 show perspective views of additional mixing chamber embodiments designed to enhance mixture uniformity. The mixing chamber 20 depicted in FIG. 6 utilizes a single swirler mixer 65 to deliver a well mixed fuel mixture. The swirler mixer 65 includes a center body having a pointed nose section 65a, a pointed tail section 65b, and vanes 65c positioned in the middle section.

Figure 7:
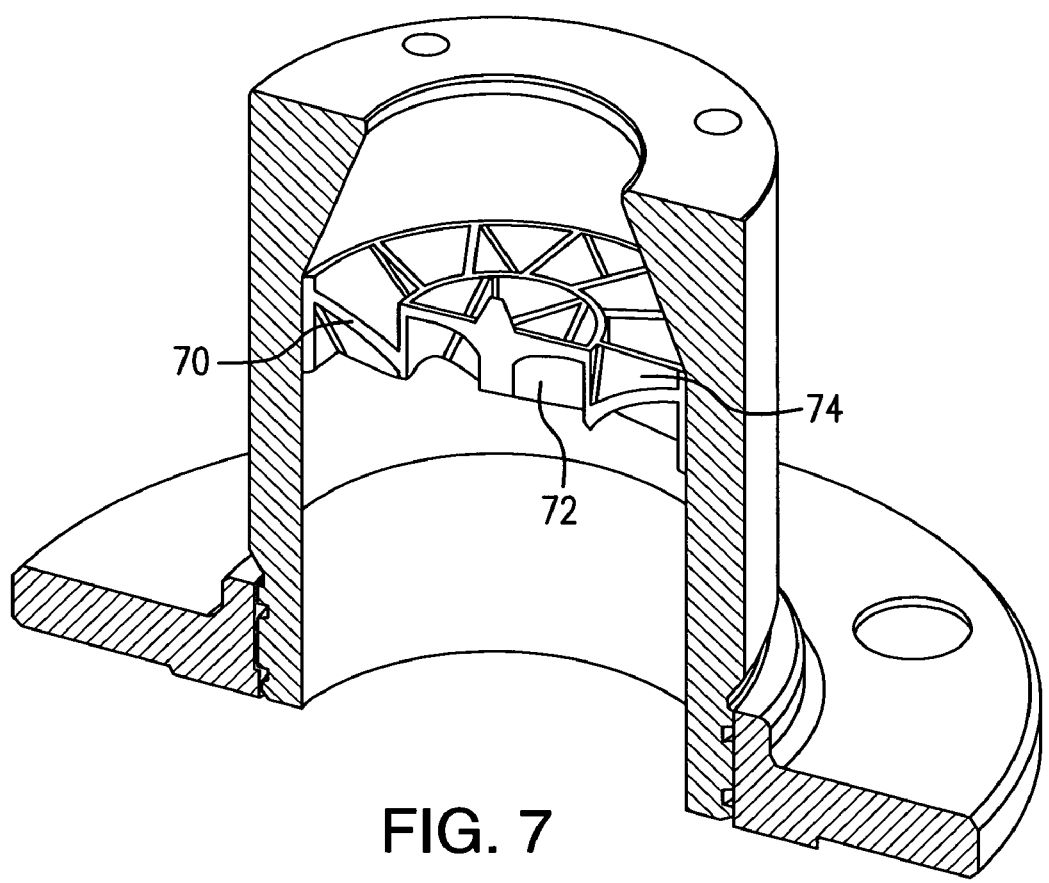
FIG. 7 shows a perspective view of a mixing chamber having a double mixer equipped with an inner swirler and an outer swirler made in accordance with the present invention.

FIG. 7 shows a mixing chamber design that utilizes a double-swirler mixer 70. It contains counter-rotating vanes. The swirl direction of the inner swirler 72 is opposite to that of the outer swirler 74. The counter-rotating arrangement in a double-swirler mixer 70 seems to provide excellent mixing and flow stabilization for cases with wide angle mixture pattern or high speed flows.

Figure 8:
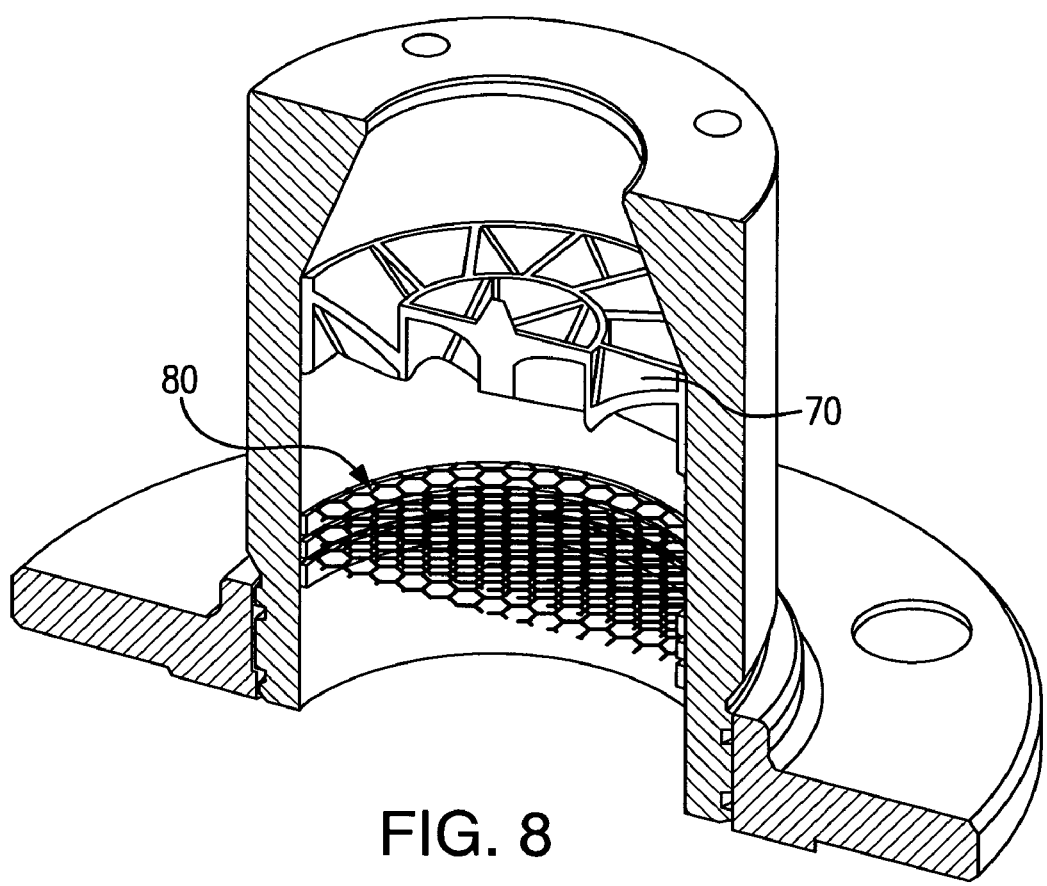
FIG. 8 shows a perspective view of a mixing chamber having a double mixer and a stack of three perforated plates made in accordance with the present invention.

FIG. 8 shows another mixing chamber embodiment that is equipped with a stack of three perforated plates 80 downstream of the double-mixer 70. The number of perforated plates, their porosity, spacing, and alignment need to be properly selected to meet the mixing chamber pressure drop requirement. To achieve optimum mixing performance, it is preferable to use at least two perforated plates with total porosity of 60% or less.

Figure 9A:
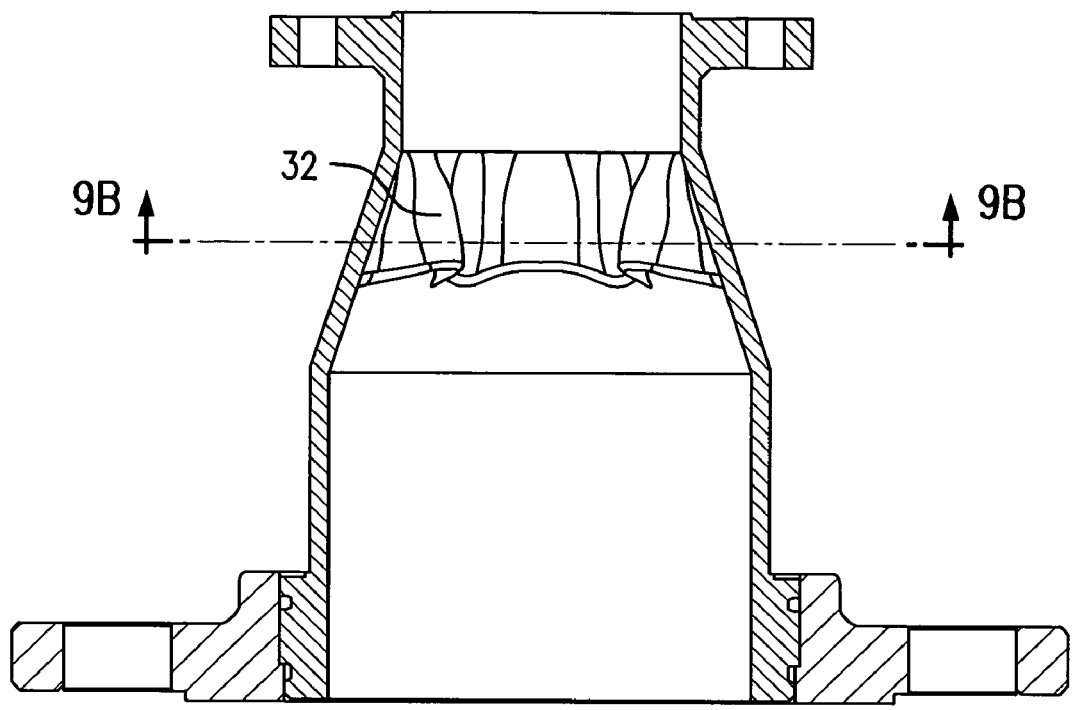
FIGS. 9(A)-9(B) show views of a lobed mixing chamber made in accordance with the present invention.
Figure 9B:
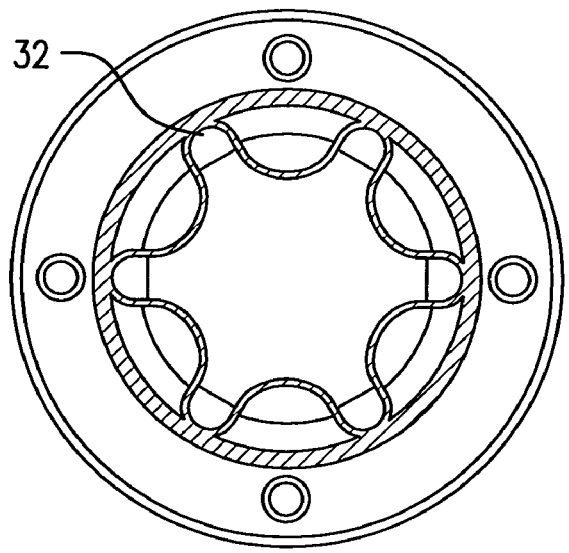

FIGS. 9(A)-9(B) show views of another mixing chamber embodiment with the lobed mixing device 30. The midsection of the mixing chamber transitions from a circular shape into a contour resembling a star shape with six fingers 32. The outer "fingers" or lobes diverge from the centerline (moving downstream), while the contour in the central "hub" area converges. This configuration effectively mixes and evens the flow field within a very short distance downstream.

Figure 10A:
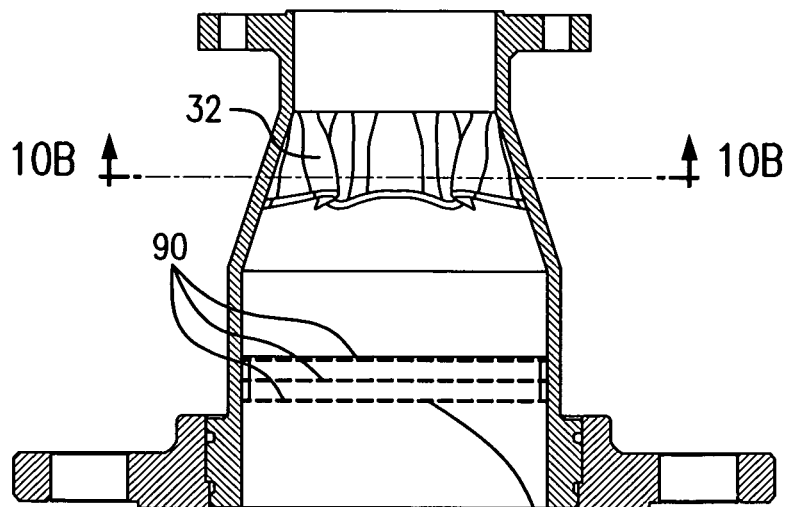
FIGS. 10(A)-10(C) show views of a mixing chamber including the lobed mixer and a stack of three perforated plates made in accordance with the present invention.
Figure 10C:
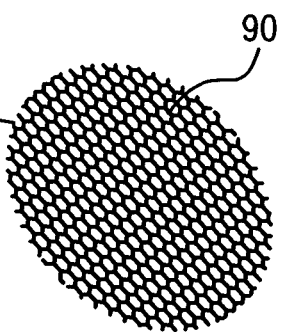
Figure 10B:
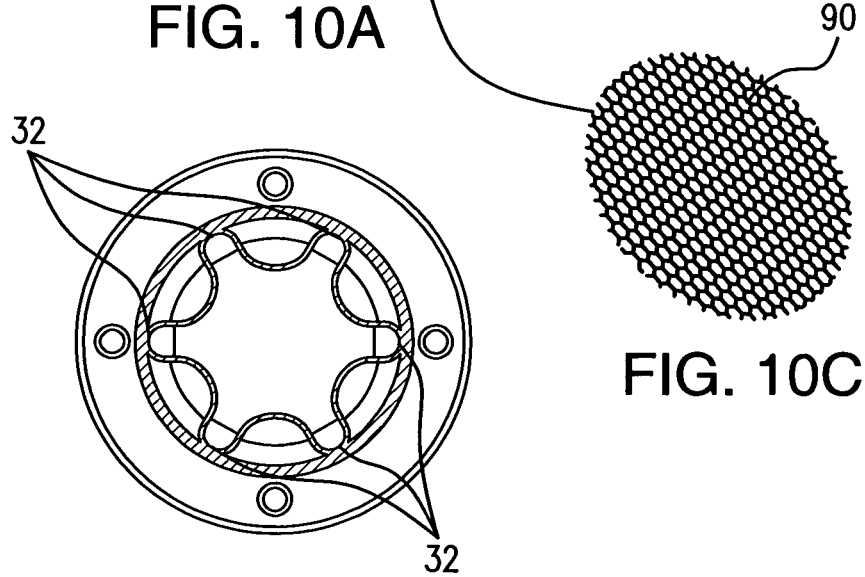

FIGS. 10(A)-10(C) show yet another mixing chamber embodiment having a lobed mixer 30 and a stack of three perforated plates 90. This configuration has proven to be quite effective in producing a very uniform fuel/gas mixture over the entire cross section of the reactor entrance. Further details on these mixing chambers are provided in copending U.S. patent application Ser. Nos. 11/108,066 and 11/317,119, each of which is incorporated by reference herein in its entirety.

It is another object of the present invention to provide an integrated fuel injection and mixing system that could be easily modified to work for other types of fuel reformers. In the case of a steam reformer (SR) and a catalytic partial oxidation (CPOX) reformer, there are only two feed streams connected to the injector unit. The injector described in FIG. 3(A), which could be used for ATR applications, could be slightly modified and adapted to meet other operational requirements. In the case of CPOX operation, hot air flow can be supplied through the inlet port 18. The air fitting 28 and air swirler 23 can be eliminated, or used for anode recycle gas. For SR applications, the inlet port 18 can be used to deliver steam flow and the air fitting 28 can be either blocked or used for anode recycle gas.

In accordance with still a further aspect of the invention, the fuel injection and mixing system can further include a control system for controlling the flow of fluids into the mixing chamber and atomization of the fluids to form a fuel vapor mixture.

Figure 11:
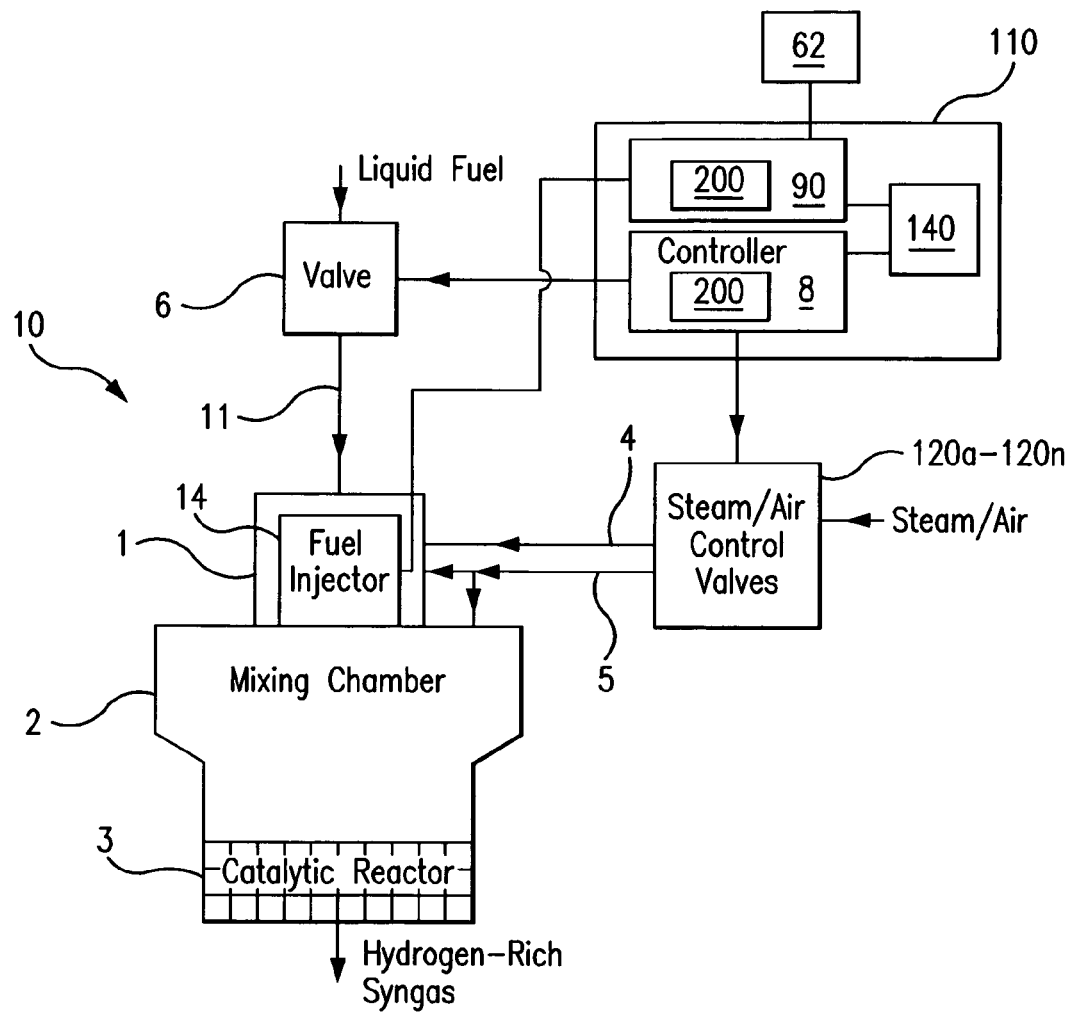
FIG. 11 shows a schematic view of a system made in accordance with the present invention illustrating the control system made in accordance with the present invention.

For purposes of illustration and not limitation, as embodied herein and as depicted in FIG. 11, system 10 can include a control system 110 and at least one controllable valve 120a-n, wherein each controllable valve 120 is adapted and configured to control the flow of fluids into the system 10. The control system 110 can accordingly include a valve controller 8 operably coupled to the plurality of valves 120, wherein the valve controller 8 is adapted and configured to control the flow of fluids into the system by operating the controllable valves 120.

Control system 110 can be further coupled to the piezoelectric atomization system as described herein for atomizing fuel passing through the piezoelectric fuel atomizer 14.

By way of further example, if desired, the control system 110 can be automated and programmable. As such, control system 110 can further include a machine readable program containing instructions for controlling the fuel injection and mixing system 10.

The machine readable program is adapted to be read by processors 200 in valve controller 8 and piezo driver unit controller 90 in order to operate various portions of system 10 in accordance with the methods of operation embodied herein. Valve controller 8 and piezo driver unit controller 90 may be separate components, or integrated to act as a single controller having one or more processors 200. The computer program may be embodied either in software or in hardware, such as a memory chip 140 in the system 10 for controllers 8, 90 to access when needed. Computer program may alternatively be embodied in a software program and run from a computer located inside or outside of the device.

The computer program may be written using techniques well known in the art. The computer program in accordance with the invention has instructions therein for operating the system 10. The program can include, for example, means for operating the controller 90 to atomize fuel ultrasonically at predetermined sweeping and pulsed frequencies, or include phase tracking for example. If desired, the program can also include means for operating the valve controller 8 to modulate the flow of fluids into the system to form a fuel mixture in the mixing chamber.

Having described certain embodiments of the invention, it will be apparent to those of ordinary skill in the art that other embodiments incorporating the concepts disclosed herein may be used without departing from the spirit and scope of the invention. The described embodiments are to be considered in all respects as only illustrative and not restrictive.

What is claimed is:

1. A fuel injector comprising:
   an injector housing;
   a piezoelectric atomizer body mounted in the injector housing and disposed along a central axis of the injector housing, the atomizer body having a narrowed stem portion with a broadened atomizing tip;
   a fuel flow passage formed within the injector housing;
   a fuel jet in fluid communication with the fuel flow passage;
   a plurality of gas flow passages formed within the injector housing, the plurality of gas flow passages comprising at least an outer gas flow passage and an inner gas flow passage, the outer gas flow passage being farther away from the central axis than the inner gas flow passage;
   an outer swirler in fluid communication with the outer gas flow passage, the outer swirler having an angled vane configured to direct the gas exiting the outer gas flow passage toward the atomizing face; and
   an ultrasonic transducer in mechanical communication with the atomizer body, the ultrasonic transducer being configured to cause the atomizer body to resonate at a resonant frequency to atomize the fuel;
   wherein the fuel jet and the swirler are positioned such that gases exiting the swirler mix with fuel exiting the fuel jet; and
   wherein the gases direct the fuel toward an atomizing surface of the broadened atomizing tip where atomization of the fuel occurs.

2. The fuel injector of claim 1, wherein the gases include air and steam.

3. The fuel injector of claim 1, wherein the plurality of gas flow passages are each configured to accommodate the flow of at least one of air and steam.

4. The fuel injector of claim 1, wherein the inner gas flow passage is in fluid communication with an inner swirler having a plurality of discrete holes circumferentially spaced around the injector housing and positioned such that the gas exiting the inner flow passage is directed toward the atomizing face.

5. The fuel injector of claim 1, wherein the outer swirler comprises a plurality of swirlers uniformly distributed around a perimeter of the atomizing surface.

6. The fuel injector of claim 1, wherein the fuel jet comprises a plurality of fuel jets equally spaced around a perimeter of the atomizing surface.

7. The fuel injector of claim 1, wherein the fuel jet comprises eight fuel jets equally spaced around a perimeter of the atomizing surface.

8. The fuel injector of claim 1, wherein the piezoelectric atomizer body is physically isolated from all other portions of the fuel injector.

9. The fuel injector of claim 1, further comprising a dampening gasket material interposed between the piezoelectric atomizer body and the injector housing to physically isolate the piezoelectric atomizer from the injector housing.

10. The fuel injector of claim 1, further comprising a plurality of O-rings configured to physically isolate the piezoelectric atomizer from the injector housing and to provide a fluid seal.

11. The fuel injector of claim 1, wherein the fuel injector is configured to atomize fuel at a mass flow rate of less than about fifteen pounds per hour.

12. A fuel injector comprising:
    an injector housing;
    a piezoelectric atomizer body mounted in the injector housing, the atomizer body having a narrowed stem portion with a broadened atomizing tip;
    a fuel flow passage formed within the injector housing;
    a fuel jet in fluid communication with the fuel flow passage;
    a gas flow passage formed within the injector housing;
    a swirler in fluid communication with the gas flow passage; and
    an ultrasonic transducer in mechanical communication with the atomizer body, the ultrasonic transducer being configured to cause the atomizer body to resonate at a resonant frequency to atomize the fuel;
    an ultrasonic driver operably coupled to the ultrasonic transducer, wherein the ultrasonic driver is equipped with a frequency sweeping control function to modulate vibrational frequency of an applied pressure wave to optimize atomization;
    wherein the fuel jet and the swirler are positioned such that gases exiting the swirler mix with fuel exiting the fuel jet; and
    wherein the gases direct the fuel toward an atomizing surface of the broadened atomizing tip where atomization of the fuel occurs.

13. A fuel injector comprising:
    an injector housing;
    a piezoelectric atomizer body mounted in the injector housing, the atomizer body having a narrowed stem portion with a broadened atomizing tip;
    a fuel flow passage formed within the injector housing;
    a fuel jet in fluid communication with the fuel flow passage;
    a gas flow passage formed within the injector housing;
    a swirler in fluid communication with the gas flow passage; and
    an ultrasonic transducer in mechanical communication with the atomizer body, the ultrasonic transducer being configured to cause the atomizer body to resonate at a resonant frequency to atomize the fuel;
    an ultrasonic driver operably coupled to the ultrasonic transducer, wherein the ultrasonic driver is equipped with a pulse control function to modulate vibrational amplitude of an applied pressure wave to optimize atomization;

wherein the fuel jet and the swirler are positioned such that gases exiting the swirler mix with fuel exiting the fuel jet; and wherein the gases direct the fuel toward an atomizing surface of the broadened atomizing tip where atomization of the fuel occurs.

14. A fuel injector comprising:

an injector housing;

a piezoelectric atomizer body mounted in the injector housing, the atomizer body having a narrowed stem portion with a broadened atomizing tip;

a fuel flow passage formed within the injector housing;

a fuel jet in fluid communication with the fuel flow passage;

a gas flow passage formed within the injector housing;

a swirler in fluid communication with the gas flow passage; and an ultrasonic transducer in mechanical communication with the atomizer body, the ultrasonic transducer being configured to cause the atomizer body to resonate at a resonant frequency to atomize the fuel;

an ultrasonic driver operably coupled to the ultrasonic transducer, wherein the ultrasonic driver is equipped with a phase tracking function to monitor and adjust frequency of an applied pressure wave to optimize atomization;

wherein the fuel jet and the swirler are positioned such that gases exiting the swirler mix with fuel exiting the fuel jet; and wherein the gases direct the fuel toward an atomizing surface of the broadened atomizing tip where atomization of the fuel occurs.

\* \* \* \* \*